(12) United States Patent
Hammoud

(10) Patent No.: US 8,751,949 B2
(45) Date of Patent: Jun. 10, 2014

(54) SELECTABLE VARIABLE SPEED CONTROLLED OBJECT MOVEMENT

(75) Inventor: Amer Hammoud, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 13/092,026

(22) Filed: Apr. 21, 2011

(65) Prior Publication Data

US 2012/0272170 A1    Oct. 25, 2012

(51) Int. Cl.
*G06F 3/00* (2006.01)
*G06F 3/0486* (2013.01)

(52) U.S. Cl.
CPC ................................ *G06F 3/0486* (2013.01)
USPC ............................................ 715/769; 345/159

(58) Field of Classification Search
CPC ....................................................... G06F 3/0486
USPC .............................................. 715/769; 345/159
See application file for complete search history.

(56) References Cited

U.S. PATENT DOCUMENTS

| | | | |
|---|---|---|---|
| 5,726,687 A | 3/1998 | Belfiore et al. | |
| 6,259,432 B1 | 7/2001 | Yamada et al. | |
| 6,337,694 B1 | 1/2002 | Becker et al. | |
| 6,677,965 B1 | 1/2004 | Ullmann et al. | |
| 2007/0143706 A1 | 6/2007 | Peters | |
| 2009/0046079 A1* | 2/2009 | Inoue et al. | 345/178 |
| 2009/0083660 A1* | 3/2009 | Lettau | 715/784 |
| 2009/0160774 A1* | 6/2009 | Lee et al. | 345/166 |
| 2009/0256803 A1* | 10/2009 | Tsai et al. | 345/157 |
| 2010/0085318 A1* | 4/2010 | Lee et al. | 345/173 |
| 2010/0090955 A1 | 4/2010 | Chen et al. | |

FOREIGN PATENT DOCUMENTS

EP      0474234 A2      3/1992

* cited by examiner

*Primary Examiner* — Tuyetlien Tran
(74) *Attorney, Agent, or Firm* — Konrad Raynes Davda & Victor LLP; Janaki K. Davda

(57) ABSTRACT

A technique for selectable variable speed for controlled object movement receives a selection of a point on an object being moved, using a selector, to form a selected point, calculates a displacement of the selected point from a center of the object being moved to form a displacement value, calculates a sensitivity value using the displacement value, calculates a movement speed using the sensitivity value, wherein a ratio of movement speed to displacement is configurable as a ratio that is inversely proportional to the distance from the center of the object being moved and provides movement speed information for object movement.

20 Claims, 5 Drawing Sheets

SELECTABLE VARIABLE SPEED CONTROLLED OBJECT MOVEMENT

BACKGROUND

1. Technical Field

This disclosure relates generally to object movement in a data processing system and more specifically to selectable variable speed controlled object movement in the data processing system.

2. Description of the Related Art

Studies have been performed in the area of human interaction with an object, which have been extended to current usage with computers and associated pointing devices. Previous studies were typically related to targeting an object for selection and how quickly a user could attain a target object from among other objects in user interface display.

For example, Fitts's law was developed to predict the time required to move to a target area and is a function of the distance to the target area and the size of the target area. Fitts's law is used to model the process of pointing, wherein pointing includes physically contacting a target object with a hand or finger, or virtually contacting the target object by pointing to an object on a graphic user interface of a computer display using a haptic device.

Researchers used the distance from the starting point to the center of the target object in the calculation of predicting time required to reach and select the object. When determining a center of a target object, a fixed point of an isometry group is a point that is a fixed point for every isometry in the group. For any isometry group in Euclidean space, the set of fixed points is either empty or an affine space. For an object, any unique center and, more generally, any point with unique properties with respect to the object is a fixed point of a respective symmetry group.

In particular, symmetry applies for the centroid of a figure, when one exists. For example, the symmetry of a physical body is dependent not only upon the shape but includes consideration of the density of the object because the center also applies to the center of mass. When the set of fixed points of a symmetry group of an object is a singleton then the object has a specific center of symmetry.

The center of a circle is a point equidistant from points on the edge of the circle. Similarly a center of a sphere is a point equidistant from all points on the surface, and the center of a line segment is the midpoint between the two ends.

Objects having complex shapes may have several symmetries. For example, objects with several symmetries, have a center of symmetry which is the point left unchanged by the symmetric actions. The center of a square, rectangle, rhombus or parallelogram is a point at which diagonals intersect. Similarly the center of an ellipse is where the axes intersect. Typically a two dimensional object is displayed in a user interface for manipulation by a user, but three-dimensional objects can be selected as well.

With reference to current information technology, a pointing device is typically any piece of hardware used to enable a user to input spatial data into a computer. Through manipulation of a mouse, pen or finger around the surface displayed, a user can implement movements and changes to objects depicted on the computer screen. A mouse with an associated arrow is a typical type of pointing device. When a user moves the mouse device on a mouse pad, the associated arrow is moved in a corresponding manner on the display screen. A user selects an object by clicking down on the mouse, and the arrow selects the target object on which the arrow rests or touches. A selection area may be defined for an object, including an area defined as less than, equal to or larger than the size of the target object.

There are many different types of pointing devices including the mouse. The mouse is a generic term referring to many different types of pointing devices. Some pointing devices require movement of device, for example, a mouse or a track ball. An arrow moves on the screen to follow a corresponding movement of the device.

Other devices include a collection of pointing devices that rely on touching a surface to generate a corresponding movement on the computer screen. For example, a touch screen is increasingly important form of input (and output) device.

A graphics tablet relies on the actual table to bring the movement. Each point on the tablet typically represents a point on the display device enabling a user to touch a specific point on the tablet causing the associated arrow to move to the corresponding point on the computer display. A touch pad detects movement of a finger to enable an arrow to move accordingly. A touchpad may be part of the computer (for example, embedded in the keyboard area of a laptop) or an auxiliary device associated with the computer as a replacement for a mouse.

Movement of objects using the pointing devices, referred to as a drag and drop operation, has typically been controlled by software settings associated with the device. However there is no single all encompassing sweet spot for setting the sensitivity or speed of performing drag and drop operations and scrolling. Computer users typically have only a single fixed sensitivity value applicable for use with a mouse or a touch screen.

For example, a rubber band type of graphical user interface control typically controls dragging speed using images on objects to be moved by a rubber band, such that the further a user pulls the rubber band the higher the speed of dragging. When the user wants to drag an object quickly, there is typically a lag of the rubber band extending to reach the top speed. Additionally when the user want to drag an object quickly from one side of the screen to the other, the user is typically not able to drag quickly at the start of the operation and when the user tries to drop the object because the user is typically not able to extend the rubber band fully around the edges of the screen or the rubber band will disappear.

SUMMARY

According to one embodiment, a computer-implemented process for selectable variable speed for controlled object movement receives a selection of a point on an object being moved, using a selector, to form a selected point, calculates a displacement of the selected point from a center of the object being moved to form a displacement value, calculates a sensitivity value using the displacement value, calculates a movement speed using the sensitivity value, wherein a ratio of movement speed to displacement is configurable as a ratio that is inversely proportional to the distance from the center of the object being moved and provides movement speed information for object movement.

According to another embodiment, a computer program product for selectable variable speed controlled object movement comprises a computer recordable-type media containing computer executable program code stored thereon. The computer executable program code comprises computer executable program code for receiving a selection of a point on an object being moved, using a selector, to form a selected point, computer executable program code for calculating a displacement of the selected point from a center of the object being moved to form a displacement value, computer executable program code for calculating a sensitivity value using the displacement value, computer executable program code for calculating a movement speed using the sensitivity value, wherein a ratio of movement speed to displacement is configurable as a ratio that is inversely proportional to the distance from the center of the object being moved and computer executable program code for providing movement speed information for object movement.

According to another embodiment, an apparatus for selectable variable speed controlled object movement comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a selection of a point on an object being moved, using a selector, to form a selected point, calculate a displacement of the selected point from a center of the object being moved to form a displacement value, calculate a sensitivity value using the displacement value, calculate a movement speed using the sensitivity value, wherein a ratio of movement speed to displacement is configurable as a ratio that is inversely proportional to the distance from the center of the object being moved and provide movement speed information for object movement.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
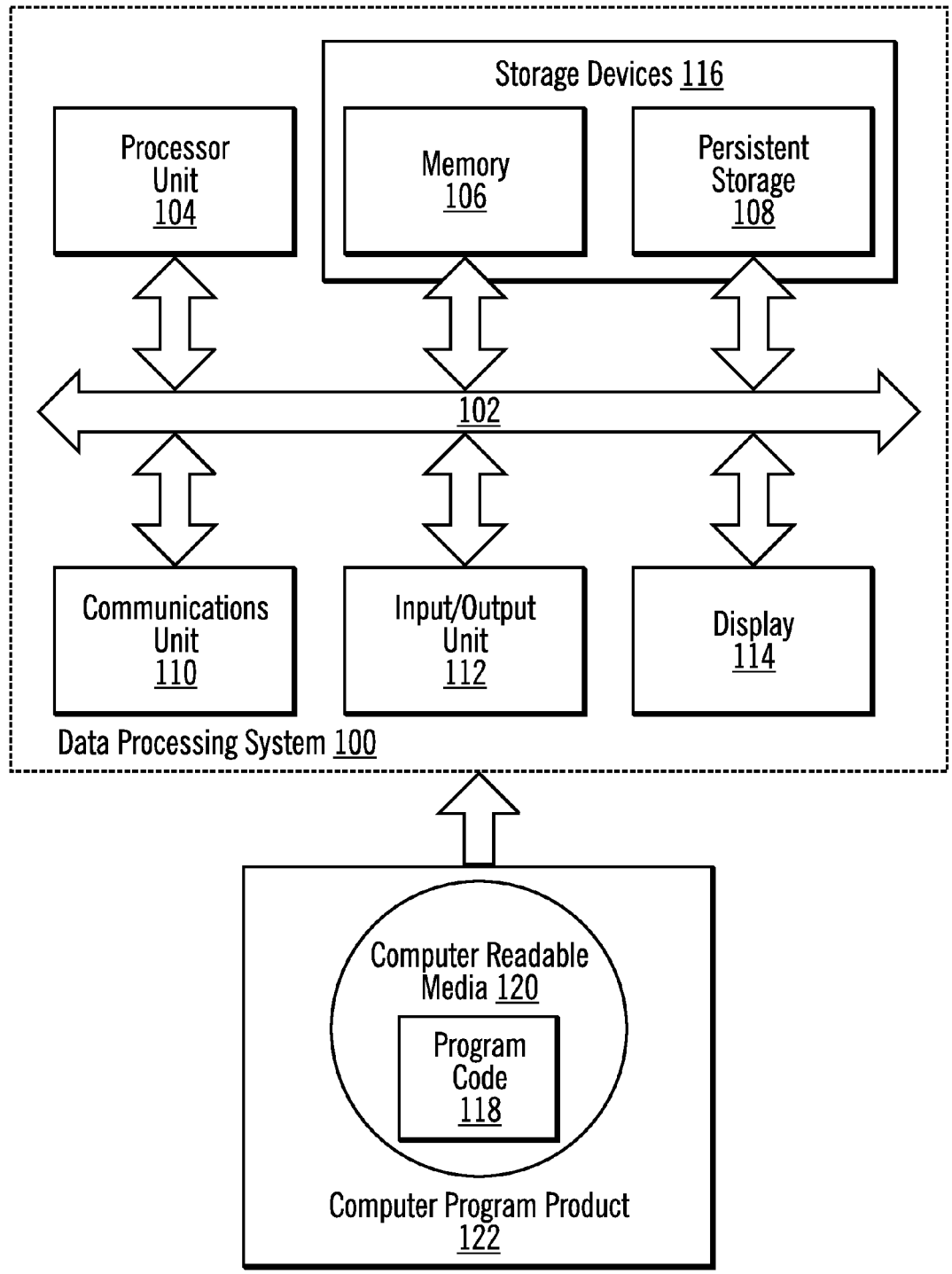
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java is a registered trademark and all Java-based trademarks and logos are trademarks of Oracle in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for selectable variable speed for controlled object movement receives a selection of a point on an object being moved, using a selector, to form a selected point, calculates a displacement of the selected point from a center of the object being moved to form a displacement value, calculates a sensitivity value using the displacement value, calculates a movement speed using the sensitivity value wherein a ratio of movement speed to displacement is configurable as a ratio that is inversely proportional to the distance from the center of the object being moved and provides movement speed information for object movement.

Using data processing system 100 of FIG. 1 as an example, an illustrative embodiment provides the computer-implemented process stored in memory 106, executed by processor unit 104, for selectable variable speed for controlled object movement. Processor unit 104 receives a selection of a point on an object being moved from a graphical user interface, using a selector, to form a selected point. Processor unit 104 calculates a displacement of the selected point from a center of the object being moved to form a displacement value, calculates a sensitivity value using the displacement value, calculates a movement speed using the sensitivity value wherein a ratio of movement speed to displacement is configurable as a ratio that is inversely proportional to the distance from the center of the object being moved and provides movement speed information for object movement on display 114 or through communications unit 110 for a remote display on another data processing system such as data processing system 100 of FIG. 1 forming a network data processing system.

In an alternative embodiment, program code 118 containing the computer-implemented process may be stored within computer readable media 120 as computer program product 122. In another illustrative embodiment, the process for selectable variable speed for controlled object movement may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
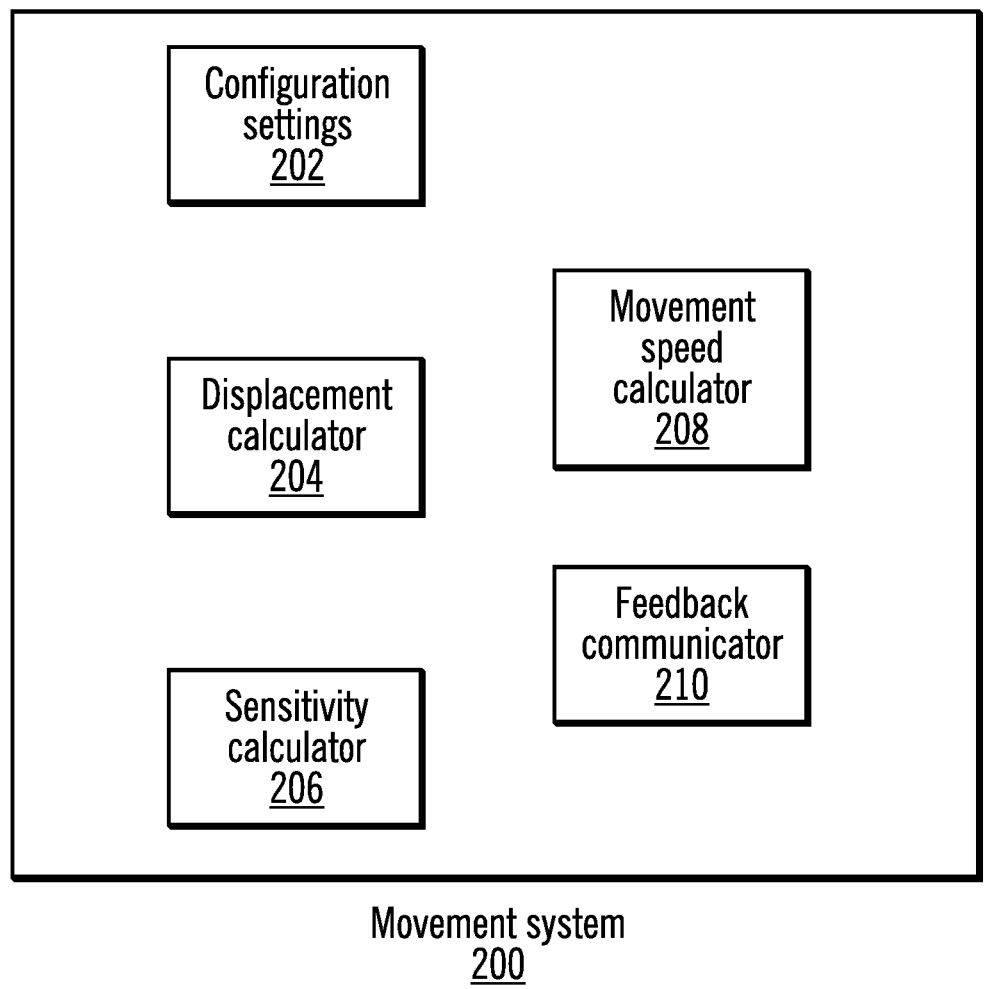
FIG. 2; is a block diagram of a block diagram of movement system, in accordance with various embodiments of the disclosure.

With reference to FIG. 2, a block diagram of movement system, in accordance with various embodiments of the disclosure is presented. Movement system 200 is an example of a variable speed controlled object movement system used within a data processing system such as data processing system 100 of FIG. 1.

Movement system 200 leverages support of a data processing system 100 and includes a number of components comprising configuration settings 202, displacement calculator 204, sensitivity calculator 206, movement speed calculator 208, and feedback communicator 210. The components of movement system 200 may be implemented as a combination of discrete components or as a combination of functional elements in a monolithic structure or other suitable configuration as required by a particular installation.

Configuration settings 202 is a data structure providing a capability to maintain values needed for the operation of movement system 200. For example, default values for an initial setting of sensitivity are provided in configuration settings 202. In another example, dimensions are provided in configuration settings 202 for types of objects such as stamps and templates used in business drawings. In another example, sensitivity and speed of drag operation are provided as initial values in configuration settings 202. Configuration values may be modified during operation of movement system 200.

Displacement calculator 204 provides a capability to determine distance between an object center and a point on the object at which the object is selected. Displacement is a simple distance between a center point of a target object and a selection point on the object typically identified by a selector, such as a cursor location on the object, when the object selection is made. Determination of a displacement value is necessary to provide input to a sensitivity calculation.

Sensitivity calculator 206 provides a capability to determine a value that is dependent upon the displacement of a selection point of an object from a center point of the selected object. The sensitivity value is inversely proportional to the displacement distance. For example, the sensitivity of movement operations is inversely proportional to how far the movement operation is initiated from the center point of the object being moved, where high sensitivity in a drag operation is corresponds to dragging at a high speed, and low sensitivity corresponds to dragging at a low speed, such as when a user needs to nudge an object.

Movement speed calculator 208 provides a capability to determine a speed of movement value using the output of sensitivity calculator 206 and configuration settings 202. For example, in one illustrative embodiment movement speed calculator 208 uses the output of sensitivity calculator 206 directly. In another illustrative embodiment movement speed calculator 208 modifies the output of sensitivity calculator 206 by applying a factor to the sensitivity value.

Feedback communicator 210 provides a capability to input sensitivity calculation values to a user interface control that is directing movement of the target object image. In a similar manner feedback communicator 210 provides sensitivity information to haptic devices enabling variable speed movement. For example, a haptic device may vibrate faster during high sensitivity movements. Feedback communicator 210 provides movement speed information to a graphical user interface enabling the graphical user interface to move the object in a direction and speed according to the direction of an object selector and the calculated movement speed.

Movement system 200, in one illustrative embodiment, enables a user to control sensitivity of drag and drop operations and cursor movements dealing with touch screens and mouse-initiated operations. Movement system 200 sets sensitivity of movement operations inversely proportional to a distance from the center point of the object being dragged to a point where the drag operation was initiated, wherein high sensitivity corresponds to dragging at a highest speed, and low sensitivity corresponds to dragging at very low speeds.

For example, when using a mouse an embodiment of movement system 200 varies the effective pointer speed, requiring more mechanical travel for low sensitivity enabling more accurate nudging and less mechanical travel for high sensitivity requiring traveling relatively large distances on a user interface of a display screen. In an example using touch screens, movement system 200 varies speed of movement by setting a ratio between the distance traveled by the object and the distance traveled by the pen or thumb of a user.

Figure 3:
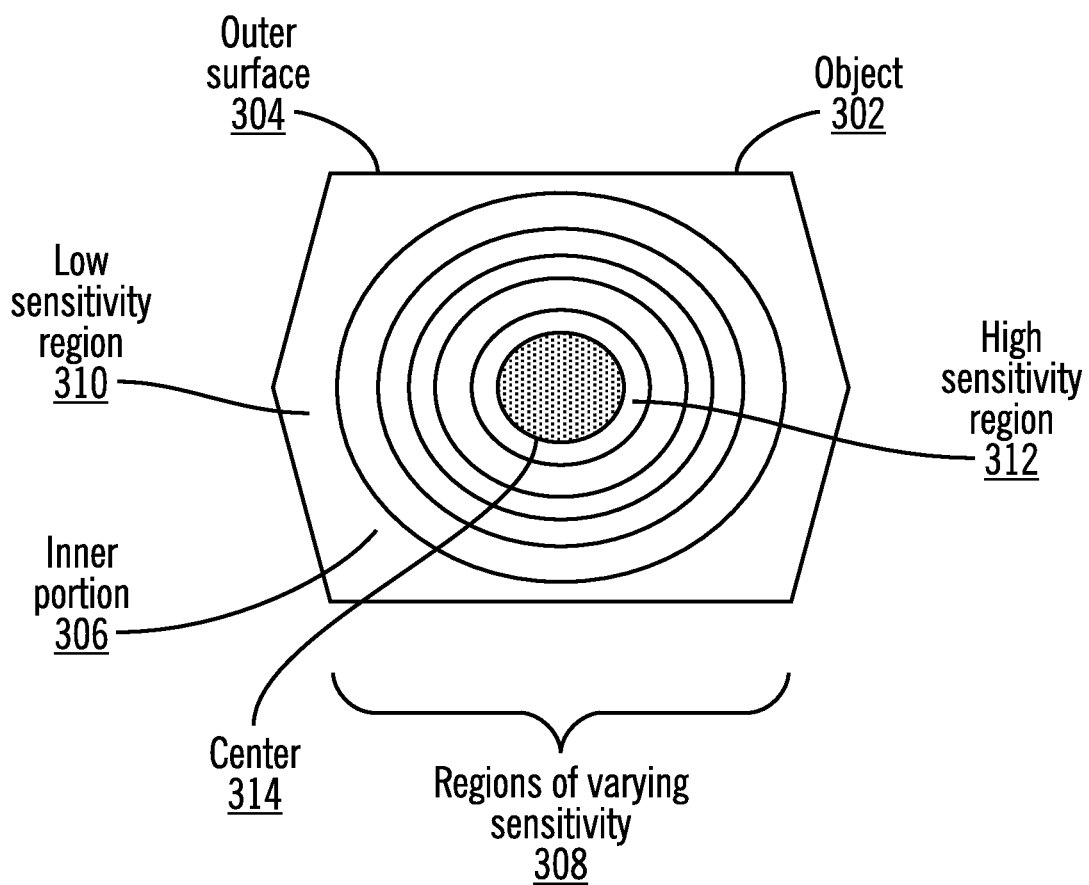
FIG. 3 is a block diagram of an object, used in the movement system of FIG. 2, in accordance with various embodiments of the disclosure.

With reference to FIG. 3, a block diagram of an object, in accordance with one embodiment of the disclosure is presented. The object is an example of an object with defined variable and selectable sensitivity regions.

Object 302, for example, may be represented in a graphic space of a user interface display as a two-dimensional or three-dimensional object. Object 302 is defined to have outer surface 304 or circumference and inner portion 306 formed between the outer surfaces or circumference.

Within inner portion 306 is a set of regions forming regions of varying sensitivity 308. Regions of varying sensitivity 308 comprise a set of regions in which low sensitivity region 310 is nearer outer surface 304 than high sensitivity region 312 located at or nearest center 314 of object 302.

Although described as having discrete regions of sensitivity, object 302 may be defined as having a continuously variable sensitivity region comprising the inner portion of the object. The regions depicted in one embodiment define bands. Concentric circles are one example of describing the varying sensitivity of the object, in which lowest sensitivity is assigned to an outer most area, and a highest sensitivity is assigned to a central area or point.

A displacement from the object center using regions of varying sensitivity 308 is used to determine sensitivity information used in a calculation of movement speed during object relocation.

Figure 4:
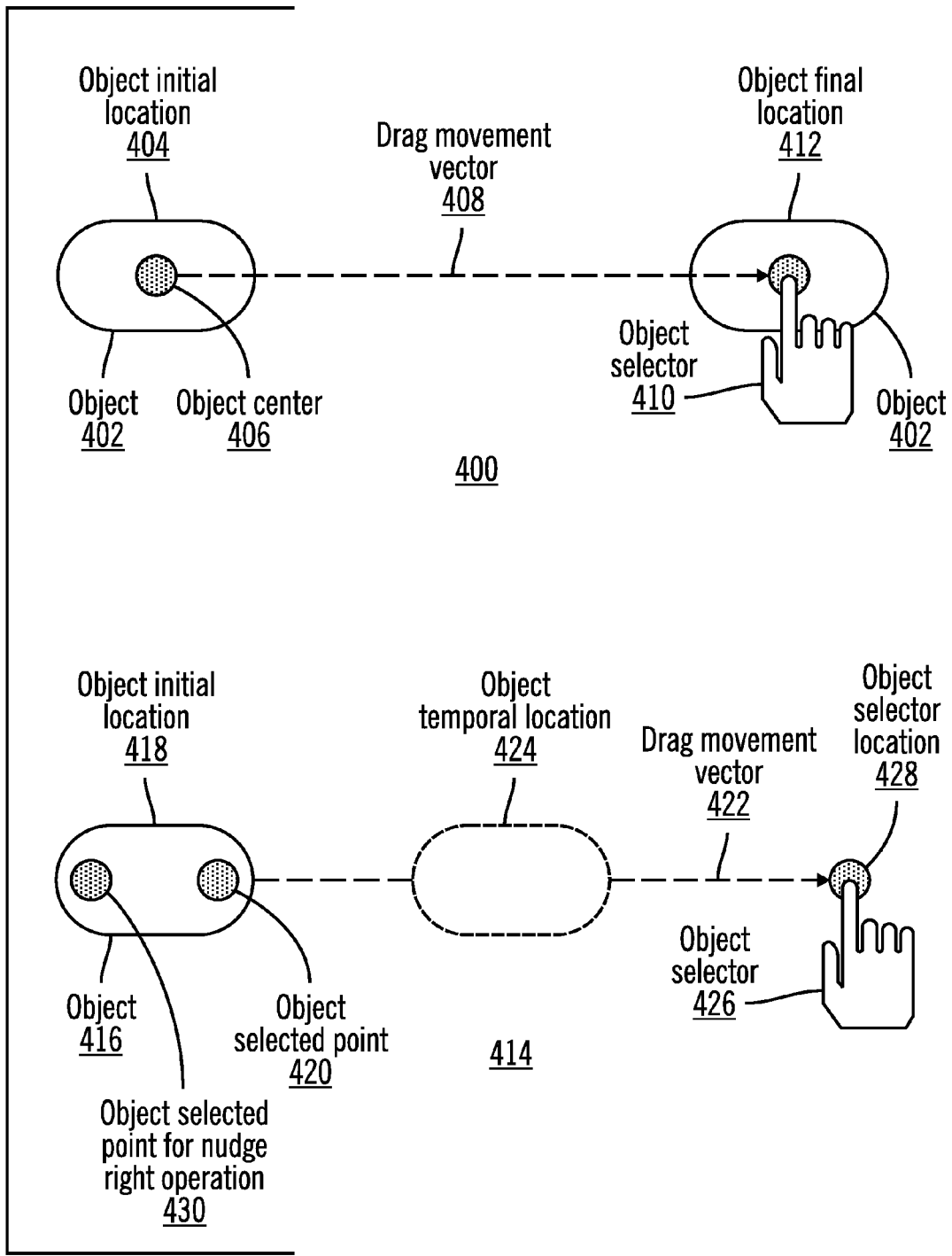
FIG. 4 is a block diagram of an object movement, using the movement system of FIG. 2, in accordance with various embodiments of the disclosure.

With reference to FIG. 4, a block diagram of an object movement, in accordance with one embodiment of the disclosure is presented. FIG. 4 provides two examples of object movement in accordance with the disclosure. In example 400, direct one to one movement using an object center is depicted. Example 414 depicts a lag movement in which an object is selected nearer an edge away from the object center.

In example 400, object 402 begins at object initial location 404 and is moved to object final location 412 using object selector 410. Object selector 410 may be a pointing device including a mouse, cursor, stylus or finger. In this example, object selector 410 selected object center 406 as a selection point for performing the move. Movement of object 402 is performed along drag movement vector 408 between object initial location 404 and object final location 412 using object selector 410.

Because the object selection point was object center 406, sensitivity of the object for a movement is deemed to be high. For example, sensitivity may be defined as a range of values between 1 and 10, with a value of 10 being a highest sensitivity assigned to a center of the object in a configuration file for types of objects such as object 402. A calculation is performed to determine a sensitivity value when a selection point occurs in a location other than a location assigned to either 1 or 10. As previously stated, sensitivity varies inversely with the distance of the selection point from the object center.

A speed of movement is then calculated using the sensitivity information. For example, a simple function is defined for speed of movement using sensitivity directly with a preconfigured value from configuration settings 202 of movement system 200 of FIG. 2. In the example, a movement speed is defined as 10 times the sensitivity value, providing a result of 100, which corresponds to a one to one movement of object 402 with object selector 410.

In example 414, object 416 begins at object initial location 418 and is to be moved to object final location 428 using object selector 426. Object selector 426 may be a pointing device including a mouse, cursor, stylus or finger. In this example, object selector 410 selected object selection point 420 as a selection point for performing the move. Movement of object 416 is performed along drag movement vector 422 between object initial location 418 and object selector location 428 using object selector 426.

Because the object selection point was not at the object center but at object selection point 420 sensitivity of the object for a movement is deemed to be low. For example, sensitivity may be defined as a range of values between 1 and 10, with a value of 10 being a highest sensitivity assigned to a center of the object in a configuration file for types of objects such as object 416. A calculation is performed to determine a sensitivity value when a selection point occurs in a location other than a location assigned to either 1 or 10. As previously stated, sensitivity varies inversely with the distance of the selection point from the object center.

A speed of movement is then calculated using the sensitivity information. For example, a simple function is defined for speed of movement using sensitivity directly with a preconfigured value from configuration settings 202 of movement system 200 of FIG. 2. In the example, a movement speed is defined as 1 times the sensitivity value, providing a result of 10, which corresponds to a lagging movement of object 418 relative to object selector 426. Object 418 is moved along drag movement vector 422 through object temporal location 424. The temporary location of object 418 shown as object temporal location 424 illustrates the lag in movement of the object compared with the object selector. The dragged object, object 418, lags behind object selector 426 because of the low sensitivity in effect. The final location of object 418 is wherever the object is when the drag operation stops. Object 418 has no inertia.

When a user needs to nudge object 416 further towards the right, for example, when the object is located near the right edge of a display window, the user should place object selection point 420 nearest a side that is farthest away from the leading edge of the object being moved, in this example, selecting a point opposite the right edge as object selected point for right nudge 430. Placing the selection point, at object selected point for right nudge 430, opposite a side of the object nearest an edge of a display window will help to ensure not over-running the display window area while performing the nudging operation.

Dimensional information for an object may be determined from querying the object or the graphical user interface rendering the object directly or indirectly. In another example, static shapes may have dimensional information contained with the configuration settings by object type. Configuration settings can also store sensitivity region values when regions are used as well as the dimensional information for each region. A function for calculating movement speed may be selectable from the configuration settings. A variety of combinations of displacement, sensitivity, and movement speed function are enabled in illustrative embodiments providing selectable variable speed controlled object movement.

FIG. 4 illustrates the further the initiation of a dragging operation is from the center point of the object being dragged, the slower and more accurate the drag operation will be and vice versa. For example, when using a touch screen when the user initiates the dragging operation by touching the object at the center, the dragging is performed normally at the same speed as the displacement of the finger. The further from the center of the object being dragged, the slower the dragging speed. The slower drag operation is accomplished by displacing the dragged object at a lower speed than the dragging finger. The ratio movement speed to displacement is configurable as a ratio that is inversely proportional to the distance from the center.

For example, when dragging an object with a mouse, the effective speed of the mouse pointer is varied in inverse proportion to the distance from the center of the object being dragged. The further the point of initiation of the dragging operation, the slower the speed of the mouse pointer. More travel over the surface of the mouse pad is required to accomplish the same displacement of the object.

Embodiments are directed to varying a drag speed. Embodiments adjust the dragging speed based on where the drag starts, without requiring presetting of the drag speed.

Thus, embodiments enable dragging an object displayed on a screen with a speed that is in relation to a distance between a center of the object and a point at which a pointing device initiates the dragging. In certain embodiments, the further from the center of the object that the dragging is initiated, the slower the dragging speed.

Embodiments offer the user a way to control the sensitivity of drag and drop operations and cursor movements dealing with both touch screens and mouse initiated operations. Embodiments set the sensitivity of the operations inversely proportional to how far the drag operation was initiated from the center point of the object being dragged, where high sensitivity is equivalent to dragging at the highest speed, and low sensitivity means dragging at very low speeds, such as when the user needs to nudge an object. For a mouse, this may be done by varying the effective pointer speed, requiring more mechanical travel for low sensitivity for accurate nudging and less mechanical travel for high sensitivity requiring traveling big distance on the screen. For a touch screen, this may be done by setting a ratio between the distance traveled by the object and the distance traveled by a pen or thumb.

Figure 5:
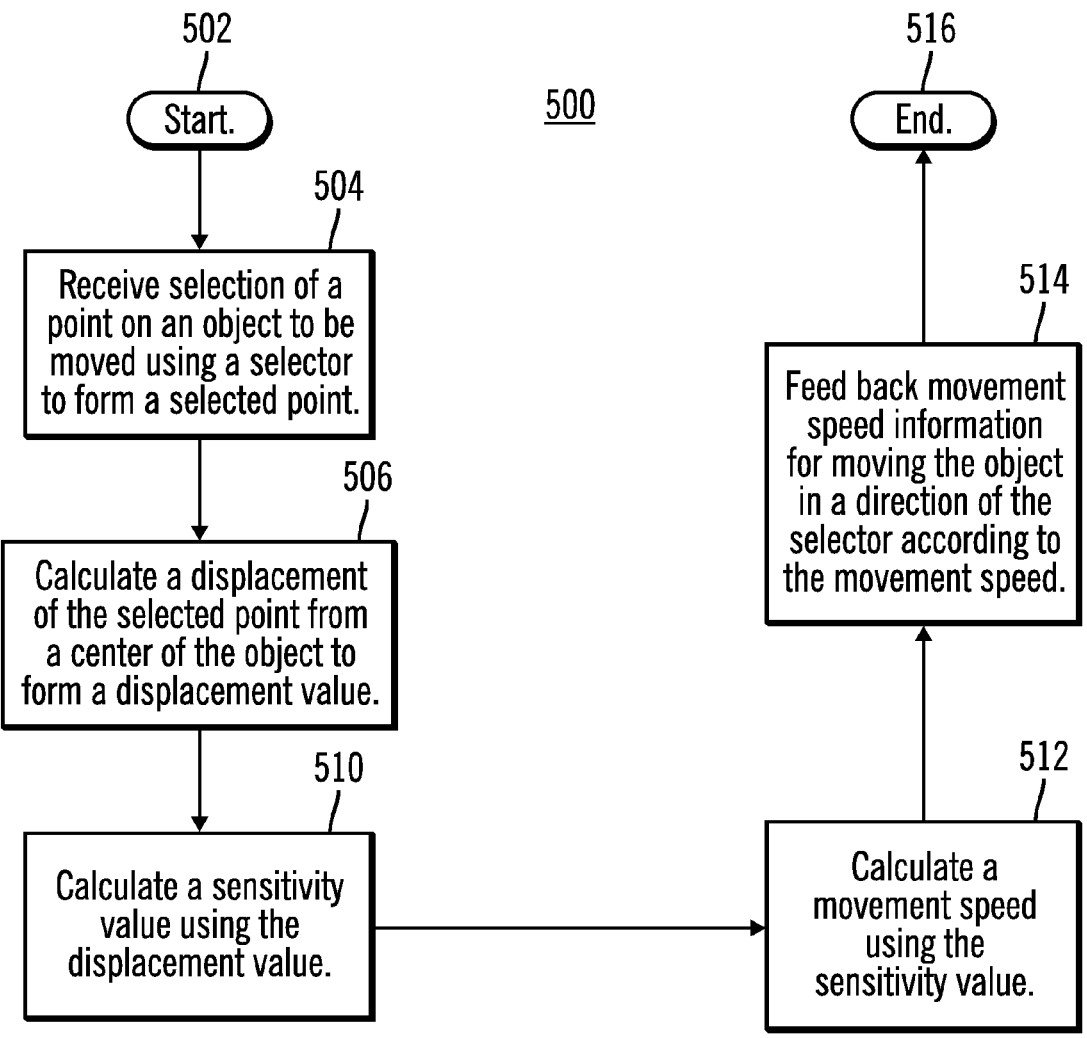
FIG. 5 is a flowchart of a selectable variable speed controlled object movement process, using the movement system of FIG. 2, in accordance with various embodiments of the disclosure.

With reference to FIG. 5, a flowchart of a selectable variable speed controlled object movement process, in accordance with one embodiment of the disclosure is presented. Process 500 is an example of a process for moving an object using movement system 200 of FIG. 2.

Process 500 begins (start 502) and receives a selection of a point on an object to be moved using a selector to form a selected point (step 504). Typically an object is selected by a user using a graphical user interface, wherein a selector may be a pointing device including a mouse, stylus or finger as suitable for the display device of the graphical user interface.

Process 500 calculates a displacement of the selected point from a center of the object to form a displacement value. Displacement may be calculated as a typical linear distance between the two points. A center point also refers to a three dimensional object.

Process 500 calculates a sensitivity value using the displacement value (step 510). As previously stated, the sensitivity value may be derived from a range of values or from one a discrete values representing a single region within the object being moved.

Process 500 calculates a movement speed using the sensitivity value (step 512). The movement speed is calculated as a function of the sensitivity value. In one illustrative embodiment a function for the movement speed simply uses the sensitivity value directly. In another illustrative embodiment a function for the movement speed uses a factor to modify the sensitivity value to derive movement speed. In either example, movement speed varies in inverse proportion to the distance from the center of the object being dragged.

Process 500 provides feed back of movement speed information for moving the object in a direction of the selector according to the movement speed (step 514) and terminates thereafter (step 516). Process 500 is not responsible for moving the object because movement is handled by graphical user interface routines using the movement speed provided by process 500. Process 500 enables a typical graphical user interface routine to provide selectable variable speed controlled object movement in accordance with illustrative embodiments of the disclosure.

Thus in one illustrative embodiment a computer implemented process for selectable variable speed controlled object movement is presented, the computer implemented process receives a selection of a point on an object being moved, using a selector, to form a selected point, calculates a displacement of the selected point from a center of the object being moved to form a displacement value, calculates a sensitivity value using the displacement value, calculates a movement speed using the sensitivity value wherein a ratio of movement speed to displacement is configurable as a ratio that is inversely proportional to the distance from the center of the object being moved and provides movement speed information for object movement.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for selectable variable speed for controlled object movement, the computer-implemented process comprising:
   receiving, using a processor of a computer, a selection of a point on an object being moved, using a selector, to form a selected point;
   calculating a displacement of the selected point from a center of the object being moved to form a displacement value;
   calculating a sensitivity value using the displacement value;
   calculating a movement speed using the sensitivity value wherein a ratio of movement speed to displacement is configurable as a ratio that is inversely proportional to the distance from the center of the object being moved; and
   providing movement speed information for object movement.

2. The computer-implemented process of claim 1 wherein the selector is one of a pointing device including a mouse, a stylus and a finger.

3. The computer-implemented process of claim 1 wherein calculating a displacement of the selected point from a center of the object being moved to form a displacement value further comprises:
   obtaining dimensional information for the object being moved from one of a configuration settings and a graphical user interface.

4. The computer-implemented process of claim 1 wherein calculating a sensitivity value using the displacement value further comprises:
   obtaining a sensitivity value from one of a configuration setting corresponding to the displacement value wherein the displacement value corresponds to a discrete sensitivity value from among a set of discrete sensitivity values and calculating a sensitivity value using the displacement value, wherein the displacement value is within a predetermined range.

5. The computer-implemented process of claim 1 wherein calculating a movement speed using the sensitivity value further comprises:
   selecting a function for calculating movement speed from a configuration settings.

6. The computer-implemented process of claim 1 wherein providing movement speed information for object movement further comprises: providing feedback of movement speed information for moving the object in a direction of the selector according to the movement speed to a graphic user interface.

7. The computer-implemented process of claim 1 wherein calculating a displacement of the selected point from a center of the object being moved to form a displacement value further comprises:
   determining dimensional information using a type of object.

8. A computer program product for selectable variable speed controlled object movement, the computer program product comprising:
   a non-transitory computer readable storage medium containing computer executable program code stored thereon, the computer executable program code comprising:
   computer executable program code for receiving a selection of a point on an object being moved, using a selector, to form a selected point;
   computer executable program code for calculating a displacement of the selected point from a center of the object being moved to form a displacement value;
   computer executable program code for calculating a sensitivity value using the displacement value;
   computer executable program code for calculating a movement speed using the sensitivity value wherein a ratio of movement speed to displacement is configurable as a ratio that is inversely proportional to the distance from the center of the object being moved; and computer executable program code for providing movement speed information for object movement.

9. The computer program product of claim 8 wherein the selector is one of a pointing device including a mouse, a stylus and a finger.

10. The computer program product of claim 8 wherein computer executable program code for calculating a displacement of the selected point from a center of the object being moved to form a displacement value further comprises:

computer executable program code for obtaining dimensional information for the object being moved from one of a configuration settings and a graphical user interface.

11. The computer program product of claim 8 wherein computer executable program code for calculating a sensitivity value using the displacement value further comprises:

computer executable program code for obtaining a sensitivity value from one of a configuration setting corresponding to the displacement value wherein the displacement value corresponds to a discrete sensitivity value from among a set of discrete sensitivity values and calculating a sensitivity value using the displacement value, wherein the displacement value is within a predetermined range.

12. The computer program product of claim 8 wherein computer executable program code for calculating a movement speed using the sensitivity value further comprises:

computer executable program code for selecting a function for calculating movement speed from a configuration settings.

13. The computer program product of claim 8 wherein computer executable program code for providing movement speed information for object movement further comprises:

computer executable program code for providing feedback of movement speed information for moving the object in a direction of the selector according to the movement speed to a graphic user interface.

14. The computer program product of claim 8 wherein computer executable program code for calculating a displacement of the selected point from a center of the object being moved to form a displacement value further comprises:

computer executable program code for determining dimensional information using a type of object.

15. An apparatus for selectable variable speed controlled object movement, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

receive a selection of a point on an object being moved, using a selector, to form a selected point;

calculate a displacement of the selected point from a center of the object being moved to form a displacement value;

calculate a sensitivity value using the displacement value;

calculate a movement speed using the sensitivity value wherein a ratio of movement speed to displacement is configurable as a ratio that is inversely proportional to the distance from the center of the object being moved; and provide movement speed information for object movement.

16. The apparatus of claim 15 wherein the selector is one of a pointing device including a mouse, a stylus and a finger.

17. The apparatus of claim 15 wherein the processor unit executes the computer executable program code to direct the apparatus to calculate a displacement of the selected point from a center of the object being moved to form a displacement value further directs the apparatus to:

obtain dimensional information for the object being moved from one of a configuration settings and a graphical user interface.

18. The apparatus of claim 15 wherein the processor unit executes the computer executable program code to direct the apparatus to calculate a sensitivity value using the displacement value further directs the apparatus to:

obtain a sensitivity value from one of a configuration setting corresponding to the displacement value wherein the displacement value corresponds to a discrete sensitivity value from among a set of discrete sensitivity values and calculating a sensitivity value using the displacement value, wherein the displacement value is within a predetermined range.

19. The apparatus of claim 15 wherein the processor unit executes the computer executable program code to direct the apparatus to calculate a movement speed using the sensitivity value further directs the apparatus to:

select a function for calculating movement speed from a configuration settings.

20. The apparatus of claim 15 wherein the processor unit executes the computer executable program code to direct the apparatus to provide movement speed information for object movement further directs the apparatus to:

provide feedback of movement speed information for moving the object in a direction of the selector according to the movement speed to a graphic user interface.

* * * * *